J. E. MUHLFELD.
JOURNAL BEARING FOR CAR AND OTHER AXLES.
APPLICATION FILED NOV. 22, 1907.
904,634.
Patented Nov. 24, 1908.
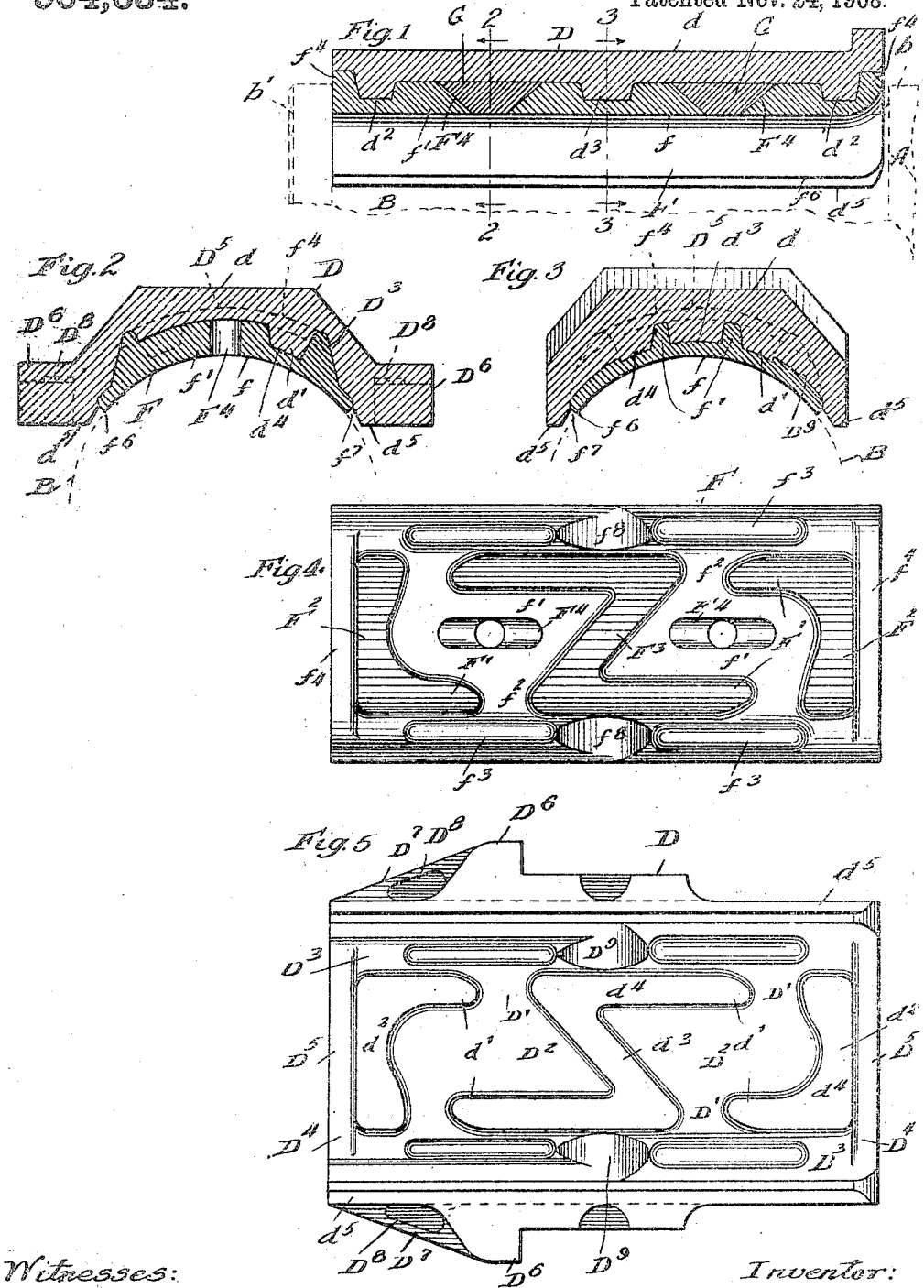
Witnesses:
Wm. Geiger
Inventor:
John E. Muhlfeld
By Munday, Evarts, Adcock & Clarke,
Attorneys

UNITED STATES PATENT OFFICE.

JOHN E. MUHLFELD, OF BALTIMORE, MARYLAND.

JOURNAL-BEARING FOR CAR AND OTHER AXLES.

No. 904,634.        Specification of Letters Patent.        Patented Nov. 24, 1908.

Application filed November 22, 1907. Serial No. 403,266.

*To all whom it may concern:*

Be it known that I, JOHN E. MUHLFELD, a citizen of the United States, residing in Baltimore, in the State of Maryland, have invented a new and useful Improvement in Journal-Bearings for Car and other Axles, of which the following is a specification.

My invention relates to journal bearings for car and other axles.

The object of my invention is to improve and perfect the journal bearing forming the subject of my Patent No. 866,154 of September 17th, 1907, and of the pending application for patent Serial No. 399,980, filed October 31st, 1907 by William H. Miner and myself.

My present improvement consists in a composite journal bearing having an imperforate main bearing metal shell of hard, strong bearing metal, such as brass, and a separate piece removable bearing metal shell or lining of soft metal, the two shells having on their meeting faces interfitting lugs and ribs or recesses and cavities by which the soft metal lining shell is securely retained in its proper position longitudinally and transversely with relation to the main shell, so as to permit of the repeated removal and replacement of the soft metal lining, and in which the inner or soft metal shell is provided with openings or recesses extending through the thick portion thereof to the under face of the shell which contacts with the journal for the purpose of containing grease or other lubricant, and for the purpose of facilitating the removal of a hard or worn out soft metal lining shell from the main or hard metal shell. The lubricant containing openings or pockets through the thicker portions of the soft metal lining shell are preferably upwardly flaring or smaller in size at their lower end, and the same are preferably oblong at the top portion where the soft metal shell contacts with the main or hard metal shell and circular at the journal contact face, and the oblong opening or pocket should extend lengthwise of the shell. These lubricant openings, recesses or pockets in the soft metal shell are preferably filled with a solid heavy lubricant that melts only under considerable temperature, and are particularly serviceable when the soft metal lining is newly applied to the journal or when the journal bearing may not immediately come in full contact with the entire length of the journal and a concentrated instead of a distributed load thereon results. Any tendency of the journal bearing to heat under such or other conditions will melt the grease or heavy lubricant in the grease pocket of the soft metal lining and cause the same to flow by gravity, and thus furnish additional lubrication at the point of greatest pressure and friction, and thereby eliminate, retard or reduce the liability for continued heating and consequent cutting of the journal and heating, melting and flowing out of the soft metal lining. Furthermore, the oil from the packing in the journal box, which from time to time tends to find its way by capillary action between the contact faces of the main shell and soft metal lining, is enabled by these openings through the soft metal lining to flow down on top of the journal either by gravity or by suction when the journal may be in normal or heated condition; and the openings thus provide additional means for supplying lubricant to the frictional parts under pressure and materially avoids liability of excessive heating of the journal or melting of the soft metal lining.

My improvement further consists in providing the side lugs of the main shell which come in contact with the ribs of the side walls of the journal box with continuations or reinforcements extending preferably in horizontal plane so that any thrust coming against the side lugs, especially at the outer end due to contact with the ribs on the side walls of the journal box will be transferred to and distributed over that portion of the side walls of the journal bearing shell between the side lug and the outside end of the shell which is nearest to the side lug, and thus prevent liability of the side lug being broken.

It further consists in providing this continuation or reinforcement of the side lug with a recess or cavity on its under side to facilitate the removal of the journal bearing shell or the journal bearing as a whole from the journal with the customary packing hook or other suitable tool or implement.

It also consists in providing the main or hard bearing metal shell with a deepened transverse channel or recess at its extreme ends and the auxiliary or soft metal lining shell with thickened transverse ribs at its extreme ends fitting in said transverse channels or recesses of the main shell at the top or crown portions of said shells below and within the key contact upper face of the main shell so that the collars at either end of the axle journal when the same are new or of the maximum Master Car Builders' diameter may come in contact only with the soft metal lining when the latter is newly applied at that portion of the journal which is confined mainly below the limits of the upper flat key or wedge bearing face of the main shell; and so that said collars at either end of the journal may come in contact or have bearing against either or both the hard metal shell and the soft metal lining when the latter is newly applied at those portions of the journal bearing which are mainly below and outside of the limits of the upper flat key or wedge bearing surface of the main shell; and so that, in the event the journal should heat and the soft metal lining should flow out, the main or brass shell of the bearing will not rest or ride upon the collars of the journal and thus cause injurious cutting and heating or breaking of the main or brass shell. The depth at the extreme end of this transverse channel at the crown portions of the main shell should be substantially equal to the collars of the journal in extent. By this construction, the collars of the journal in resisting end play have contact with the end of both the main shell and the soft metal shell; that is to say, the end thrust may be transmitted wholly or in part, through the soft metal lining, against the projecting ribs and lugs of the main shell, as well as against the body of the metal at the crown above the root of the projecting ribs and lugs.

My invention also consists in the novel construction of parts and devices and in the novel combinations of parts and devices herein shown and described and more particularly set forth in the claims.

In the accompanying drawing forming a part of this specification, Figure 1 is a central, longitudinal section of a journal bearing embodying my invention, showing also a portion of the journal. Figs. 2 and 3 are vertical cross sections on Figs. 2—2 and 3—3 of Fig. 1. Fig. 4 is a detail top view of the soft metal lining or auxiliary bearing metal shell and Fig. 5 is a detail bottom view of the main bearing metal shell of brass or other like material.

In the drawing, A represents a portion of a car or other axle, B the journal thereof and $b$ $b^1$, the inner and outer collars or shoulders at the ends of the journal.

D F is my improved journal bearing. It comprises two separable or removable imperforate bearing metal shells, the main portion D being of brass or other hard, strong and efficient bearing metal or composition of metals and in one solid integral mass, and an inner auxiliary or lining shell F of soft bearing metal or composition of metals also in one solid integral mass.

The two portions or shells D and F are made separable or removable, one from the other, so that the inner or soft metal portion F may be removed and replaced when worn or injured, by another like soft metal shell. The main bearing metal shell D has an upper face $d$, suitable for contacting or connecting with the journal box or with the journal box key or wedge.

The main bearing metal shell D of the journal bearing is provided on its inner or bearing face with integral longitudinal bearing ribs $d^1$ and with integral end bearing ribs $d^2$ and an intermediate diagonally and transversely extending bearing rib $d^3$, all having curved bearing faces $d^4$ corresponding to the curvature of the journal. The longitudinal bearing ribs $d^1$ have connecting channels $D^1$ through the same, staggered or breaking joints in respect to each other; and the longitudinal bearing ribs $d^1$ are integrally connected by the intermediate transverse diagonal bearing rib $d^3$ and by the end bearing ribs $d^1$. The connecting channels $D^1$ through the longitudinal bearing ribs $d^1$ connect the central longitudinal recesses or cavities $D^2$ with the longitudinal side cavities or recesses $D^3$ of the main bearing shell. At its extreme ends, the main bearing shell D is also provided with transverse channels or recesses $D^4$ which are made deeper at the crown or central portion $D^5$ of the main shell than the other channels and recesses or cavities of the main shell. The depth of these end recesses or channels $D^4$ at the crown or middle portion of the shell preferably about equals the projection of the collars or shoulders on the journal, so that in case the soft metal lining should, on heating of the journal, melt and flow out, the main bearing metal shell D will not ride or rest upon the collars of the journal at the extreme ends thereof. The main bearing metal shell D also has longitudinal marginal ribs or sides $d^5$ to confine the soft metal lining or auxiliary shell F and give strength to the journal bearing as a whole. These marginal longitudinal ribs or sides $d^5$ are not bearing members and are not designed to come in contact with the journal of the axle.

The side lugs $D^6$ of the main shell D which come in contact with the ribs on the side walls of the journal box are provided with continuations, extensions or reinforcements $D^7$, preferably extending longitudinally to the nearest end of the journal box. These integral reinforcing webs $D^7$ are preferably inclined about as indicated in the drawing, and are furnished on the under side with recesses $D^8$ for engagement with a packing hook or other tool to facilitate the removal of the journal bearing from the journal.

The soft metal lining or auxiliary shell F of the journal bearing is in one integral mass and is separable or removable from the main shell D and is provided on its upper or main-shell-contacting face with interfitting lugs, ribs, projections and recesses, channels or cavities corresponding to and interfitting with those on the lower face of the main shell D. The lower face $f$ of the soft metal lining or bearing shell F is curved to conform to the curvature of the journal. The shell F is furnished with central projections, lugs or thickened portions $f^1$, fitting in the central cavities $D^2$ of the main shell D, ribs $f^2$ fitting in the connecting channels $D^1$ of the shell D, longitudinal ribs or thickened portions $f^3$ fitting in the longitudinal side cavities $D^3$ of the main shell D and with transverse thickened ribs $f^4$ at its extreme ends fitting in the transversely extending deepened channels or recesses $D^4$ of the main shell D, and with channels, recesses or cavities $F^1$ $F^2$ $F^3$ to receive the corresponding bearing ribs $d^1$ $d^2$ and $d^3$ of the main shell D.

The longitudinal marginal ribs or sides $d^5$ of the main shell D extend beyond the extreme side edges $f^6$ of the soft metal shell D so as to leave an open longitudinal space, channel or groove $f^7$ in the bearing as a whole to give better access to the oil, waste or packing for more efficient lubrication of the journal and its bearing. The auxiliary or soft metal lining shell F is further provided at its thickened portions $f^1$ with lubricant openings or pockets $F^4$ extending through the same. The lubricant openings or pockets $F^4$ are preferably oblong at their upper ends and extend longitudinally of the bearing as indicated in the drawing, and are contracted in size and circular at their lower ends.

G represents grease or lubricant filling the pockets $F^4$ and with which the auxiliary soft metal lining shell F is provided before it is applied to the main shell D or to the journal. The grease or lubricant G is preferably a heavy solid lubricant composition that will not melt or flow out at an ordinary or low temperature. The lubricant pocket $F^4$ at its circular or lower end should preferably be large enough in size to admit the finger or the point of a packing hook or other like implement, and thus to enable the soft metal shell to be readily removed from the main shell when it becomes worn or requires replacement.

As the transverse rib $f^4$ at the extreme end of the soft metal bearing shell is chiefly thickened at the upper, middle or crown portion thereof and only slightly thickened at the wings or ends thereof, and as the corresponding transverse channel or recess $D^4$ at the extreme end of the main shell D is correspondingly shaped, it will be readily understood that the collars of the journal in resisting end thrust may contact with the end faces of both the main shell and soft metal shell at the lower or wing portions of the bearing, while the same will only contact with the end face of the soft metal shell at the extreme uppermost or crown portion of the journal-bearing where the depth of the channel $D^4$ and thickness of the rib $f^4$ substantially equals in extent the projection of the collar of the journal. This construction thus gives an adequate end contact of both shells against the journal collar, while at the same time preventing the main shell from riding directly on the collars at the ends thereof in case the soft metal shell should flow out on heating of the journal. The main or brass shell D is further also preferably provided with projections, lugs, or raised or thickened portions $D^9$ at the middle of the channels $D^3$, which, in connection with the bearing ribs $d^3$ $d^4$ and side ribs $d^5$ afford a substantially transverse thickened zone to the whole shell D at the middle thereof to transversely strengthen or reinforce the shell. These reinforcing lugs $D^9$ are for the purpose of securing and reinforcing the side walls $d^5$ of the main shell to the central Z shaped ribs or thickened portions $d^3$ $d^4$ $d^4$ thereof, and thus prevent spreading of the side walls of the shell under unusual strains or in the event of the journal bearing heating. The soft metal shell F is furnished with corresponding cavities $f^8$. The interengaging lugs $d^9$ and cavities $f^8$ also aid in preventing longitudinal movement of the soft metal shell F on the main shell D and coöperates with the other interfitting ribs and lugs and channels and cavities of the two shells in transmitting end play thrust of the collars of the journal through the soft metal shell F to the main shell D.

The main shell D and soft metal shell F have their lugs, ribs, projections or thickened portions and their corresponding interfitting channels or cavities made tapering, preferably about as illustrated in the drawing, so that when the soft metal lining shell is applied to and interfitted with the main shell, the tapering faces of such projecting parts on the two shells will tend to clamp one to the other when coming in contact and rigidly secure the one shell to the other when in normal position; while at the same time also readily enabling the removal of the soft shell from the main shell when it is desired to renew or replace either the soft shell or the main shell.

I claim:—

1. A composite journal bearing comprising an upper or main shell of hard, strong bearing metal and an auxiliary or soft metal lining shell separable and removable from the main shell, said shells having on their meeting faces interengaging ribs or thickened portions and cavities or channels, and said soft metal shell being also provided through its thick portions with a lubricant confining opening or pocket, said ribs or thickened portions on both the main shell and auxiliary shell extending in part transversely and in part longitudinally and presenting numerous abutment faces of aggregate extensive area to prevent longitudinal and lateral displacement of the soft metal shell substantially as specified.

2. A composite journal bearing comprising an upper or main shell of hard, strong bearing metal and an auxiliary or soft metal lining shell separable and removable from the main shell, said shells having on their meeting faces interengaging ribs or thickened portions and cavities or channels, and said soft metal shell being also provided through its thick portion with a lubricant confining opening or pocket, said lubricant opening or pocket being of greater size at its upper portion than its lower portion, said ribs or thickened portions on both the main shell and auxiliary shell extending in part transversely and in part longitudinally and presenting numerous abutment faces of aggregate extensive area to prevent longitudinal and lateral displacement of the soft metal shell substantially as specified.

3. A composite journal bearing comprising an upper or main shell of hard, strong bearing metal and an auxiliary or soft metal lining shell, separable and removable from the main shell, said shells having on their meeting faces interengaging ribs or thickened portions and cavities or channels, and said soft metal shell being also provided through its thick portion with a lubricant confining opening or pocket, said lubricant opening or pocket being of greater size at its upper portion than its lower portion and of an oblong shape at its upper portion, said ribs or thickened portions on both the main shell and auxiliary shell extending in part transversely and in part longitudinally and presenting numerous abutment faces of aggregate extensive area to prevent longitudinal and lateral displacement of the soft metal shell substantially as specified.

4. A composite journal bearing comprising a main bearing shell and an auxiliary or soft metal lining shell, said shells having on their meeting faces interengaging ribs or projections and channels or cavities and said main shell having side lugs $D^6$, each furnished with an integral reinforcing web $D^7$ extending between the lug and the adjacent end of the shell, and said reinforcing web having on its under side a recess $D^8$ to facilitate the removal of the bearing from the journal, substantially as specified.

5. A composite journal bearing, comprising a main bearing metal shell, having on its under face longitudinal and end bearing ribs and cavities or recesses to receive projections or thickened portions of a lining or soft metal shell, and a separate removable lining or soft metal shell having on its upper face projections or thickened portions fitting within said cavities of the main shell, said thickened portions of said lining or soft metal shell having lubricant confining pockets therein, said ribs or thickened portions on both the main shell and auxiliary shell extending in part transversely and in part longitudinally and presenting numerous abutment faces of aggregate extensive area to prevent longitudinal and lateral displacement of the soft metal shell substantially as specified.

6. A composite journal bearing, comprising a main bearing metal shell, having on its under face longitudinal and end bearing ribs and cavities or recesses to receive projections or thickened portions of a lining or soft metal shell, and a separate removable lining or soft metal shell, having on its upper face projections or thickened portions fitting within said cavities of the main shell, said thickened portions of said lining or soft metal shell having upwardly flaring lubricant confining pockets therein, said ribs or thickened portions on both the main shell and auxiliary shell extending in part transversely and in part longitudinally and presenting numerous abutment faces of aggregate extensive area to prevent longitudinal and lateral displacement of the soft metal shell substantially as specified.

7. A composite journal bearing, comprising an imperforate, hard, strong, bearing metal shell, provided with longitudinal and end bearing ribs and an intermediate transversely and diagonally extending bearing rib on its under face, and with central and longitudinal side cavities and connecting channels between said central and said longitudinal side cavities, and a soft metal lining shell having on its upper face thickened portions or projections fitting in said cavities and connecting channels, said main and lining shells being in separate pieces and removable the one from the other to enable the lining shell to be quickly replaced by another when worn out, the thickened portions of said soft metal shell having lubricant pockets therein, substantially as specified.

8. A composite journal bearing, comprising an imperforate, hard, strong, bearing metal shell, provided with longitudinal and end bearing ribs and an intermediate transversely and diagonally extending bearing rib on its under face, and with central and longitudinal side cavities and connecting channels between said central and said longitudinal side cavities, and a soft metal lining shell having on its upper face thickened portions or projections fitting in said cavities and connecting channels, said main shell having longitudinal marginal ribs or sides projecting beyond the lower longitudinal edges of said soft lining shell said lower edges of said soft metal lining shell terminating short of the longitudinal edges of the main shell to give better access of the lubricant to the contacting surfaces of the journal and journal bearing, the thickened portions of said soft metal shell having openings therein flaring outwardly from bottom to top to afford a hold for a finger or tool and thus to facilitate the removal of the soft metal shell from the main shell, substantially as specified.

9. A journal bearing comprising in combination a main shell of hard bearing metal having longitudinal bearing ribs and transversely extending bearing ribs and a diagonally extending intermediate bearing rib, and an auxiliary shell of soft metal fitting within the main shell and provided with a lubricant cavity to confine the lubricant said soft metal shell being removable and having longitudinal ribs, transversely extending ribs and thickened central portions or projections inter-fitting with said bearing ribs on said main shell, substantially as specified.

JOHN E. MUHLFELD.

Witnesses:
Geo. W. Haulenbeek,
F. W. Busse.